Patented July 14, 1936

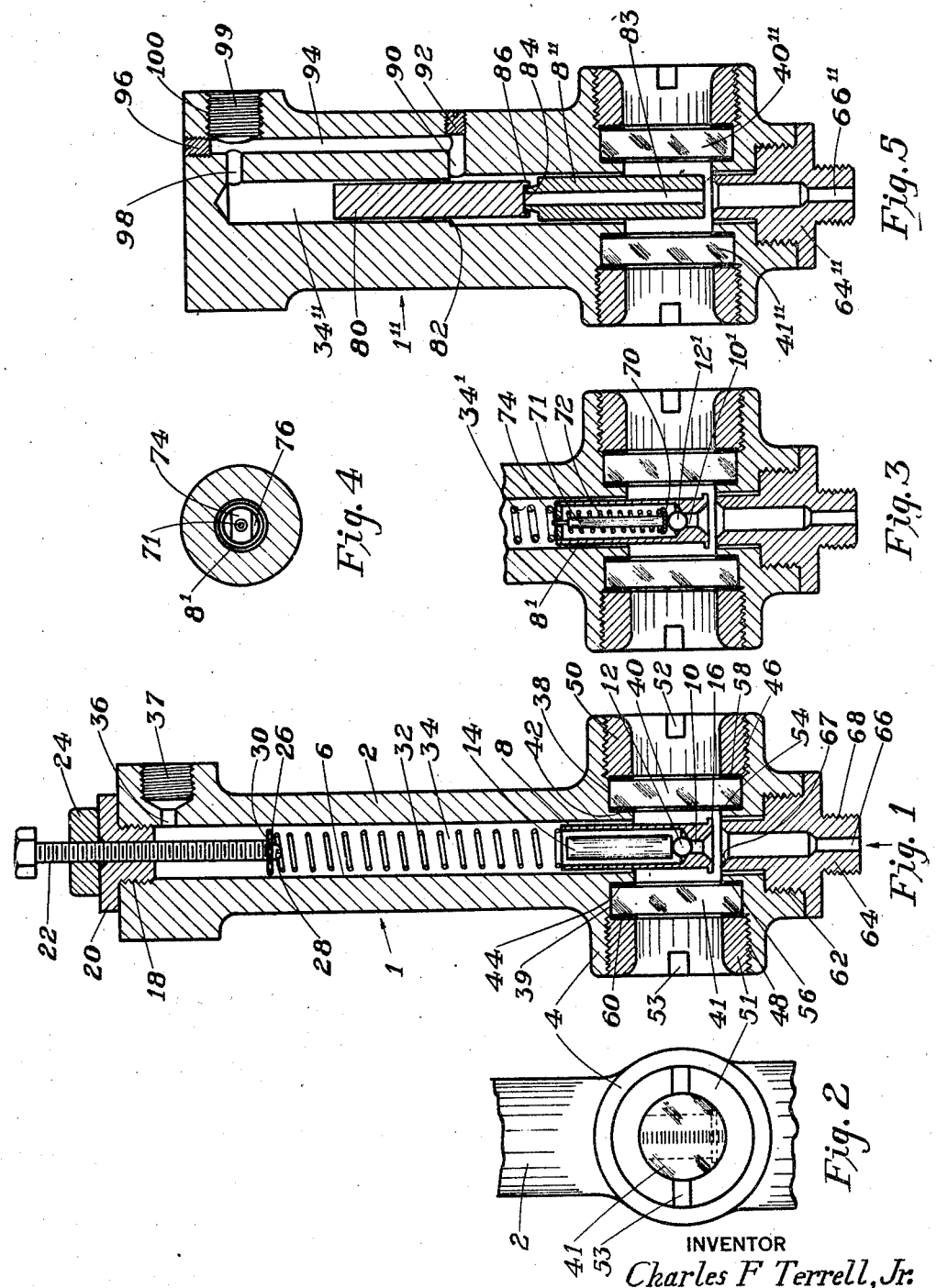

2,047,715

UNITED STATES PATENT OFFICE 2,047,715

SIGHT FEED INDICATOR AND
MEASURING DEVICE

Charles F. Terrell, Jr., Chicago, Ill., assignor to
The Pure Oil Company, Chicago, Ill., a corporation of Ohio Application March 25, 1935, Serial No. 13,005

21 Claims. (Cl. 73—194)

This invention relates to devices for observing and measuring rate of flow of fluids. More particularly the invention is concerned with sight feed indicating and measuring devices for determining the rate of feed of small quantities of liquid lubricants fed under pressure.

In an application Serial No. 759,036, filed December 24, 1934, there has been disclosed and claimed a force feed lubricator for supplying fluid under pressure to working parts of mechanical devices. In order to determine whether lubricators of this general type are pumping lubricant, it is customary to connect a sight feed indicator into the feed line from the lubricator. In one form of indicator now in commercial use, a clear fluid such as glycerine is contained therein through which the lubricant to be pumped passes and the passage of globules of lubricant upwardly through the indicator liquid can be observed since they are lighter in weight than and immiscible with the fluid contained in the indicator. This type of indicator is not entirely satisfactory since the indicator liquid often becomes displaced by the lubricant that is pumped through it, with the result that it is impossible to observe the movement of lubricant through the indicator. The mechanical or blinker type indicators, although not subject to the difficulty mentioned in connection with the liquid type indicators, like the latter, do not measure the actual quantity of lubricant flowing therethrough and hence it is not possible to accurately regulate the quantity of fluid fed by the lubricator to conform to the requirements of the various bearing and machine parts to be lubricated.

My invention is designed to overcome the disadvantages inherent in liquid flow indicators now available for commercial use. In addition to providing a simple and reliable device for observing fluid flow, means are provided for observing the volume of flow, and by checking the volume against time, the volume rate of flow can be easily calculated.

In accordance with my invention, the fluid to be measured is pumped into a receptacle against the face of a plunger, slidably mounted in a cylinder of known cross sectional area. Glass windows marked with calibrations in terms of distance or volume are positioned so that the stroke of the plunger can be observed. From the observed distance of travel of the plunger in a given time and the known area of the cylinder, the actual rate of flow can easily be calculated. The stroke of the plunger may be regulated either by a spring or by a detent, or both. By means of a valve arrangement which is adapted to permit passage of lubricant through the plunger when it has reached the end of its stroke, the plunger is caused to return to its initial position whereupon the valve arrangement closes and the lubricant fed through the indicating device again exerts pressure on the plunger to move it through another stroke.

One of the novel features of my invention is the provision of an indicating and measuring device capable of operation with fluids of widely different viscosities.

Another of the novel features of my invention resides in the provision of one or more reciprocating plungers in a sight feed indicator for observing and measuring rate of flow of fluid therethrough.

Still another novel feature of my invention resides in the means to limit and regulate the length of the stroke of the plungers within the visible range so that the volume flow of the fluid through the indicator can be accurately observed and its rate of flow calculated from observation.

A further novel feature of my invention resides in the valve assembly, of which the plungers form part, for permitting the plungers to return to their initial position.

A still further feature of my invention is the provision of an indicator by means of which performance of a fluid pumping mechanism, particularly in respect to valve leakage, can be observed.

Other novel features will be apparent from the following description considered in conjunction with the accompanying drawing, of which Figure 1 is a vertical cross sectional view of one form of indicator in accordance with my invention.

Figure 2 is a fragmentary side vertical view of a portion of the indicator shown in Figure 1.

Figure 3 is a fragmentary vertical cross sectional view of a modified form of indicator.

Figure 4 is a plan view of a portion of the indicator shown in Figure 3.

Figure 5 is a vertical cross sectional view of a still further modification of the indicator which forms the subject of my invention.

Referring to Figure 1, the numeral 1 indicates the body portion of an indicator made in accordance with my invention. The body portion may be formed of an elongated hollow cylindrical portion 2 and a lower enlarged horizontal cylindrical portion 4. The inner wall 6 of the elongated portion 2 is machined to provide a smooth sliding cylinder for the hollow plunger 8 which fits snugly therein. The lower portion of the plunger 8 is formed with the valve seat 10 upon which the ball valve 12 is adapted to be seated. Any suitable shaped valve may be used instead of the ball valve 12. A valve weight 14 is loosely fitted within the plunger 8 and is adapted to hold the ball valve 12 against its seat 10. The bottom of the plunger is formed with the lip 16.

The upper end of the body portion 1 is threaded at 18 in order to receive the bushing 20. The bushing 20 is also threaded in order to receive the adjusting screw 22. The lock nut 24 is adapted to screw tightly against the upper surface of bushing 20 and hold the screw 22 in any desired position. The lower end of the screw 22 has a spring follower 26 fastened thereto by means of a screw 28 or other suitable means. The spring follower has openings 30 therein to permit passage of fluid therethrough. A coil spring 32 is located in the cylindrical space 34 and abuts against the spring follower 26 at its upper end and against the upper edge of the plunger 8 at its lower end. A discharge opening 36 near the upper end of the body 1 provides a passageway from the space 34 to a suitable pipe line. The outer end of the bore 36 is enlarged at 37 and provided with threads to receive a suitable pipe connection.

The lower hollow cylindrical portion 4 is recessed at 38 and 39 to receive the window glasses 40 and 41. The inner faces of the window glasses abut against ring members 42 and 44 which may be formed integrally with the body 1. The ring members 42 and 44 coact with the lip 16 of plunger 8 to detent the plunger at the end of its upward stroke. The outer ends of the walls of recesses 38 and 39 are threaded at 46 and 48 to receive retaining nuts 50 and 51 which hold the window glasses firmly in place. The retaining nuts 50 and 51 are provided with slots 52 and 53 to enable them to be screwed and unscrewed. Suitable gaskets 54, 56, 58, and 60 are placed between the inner faces the glasses and the ring members 42 and 44, and between the outer faces of the glasses and the retaining nuts 50 and 51 in order to make leak proof joints.

The lower end of the body portion 1 is threaded at 62 in order to receive bushing 64. Bushing 64 has a center bore 66 which at its outer end conforms in diameter to the feed pipe to which it is to be connected and gradually widens toward its inner end 67 so as to expose a large area of the bottom face of plunger 8 to the fluid pressure. The diameter of the inner end 67 of the bore 66 is substantially equal to the diameter of the portion of the plunger 8 above the lip 16. The bushing 64 is threaded at its lower end at 68 in order to provide means for screwing the indicator to the feed line coupling.

The indicator operates as follows:

With the indicator installed in a vertical position, the liquid from a fluid pressure pump or lubricator is forced through the bore 66 of the bushing 68 and exerts pressure against the lower face of the plunger 8. The plunger 8 is at the bottom of its stroke at this time resting on top of bushing 68 and the valve 12 is closed. Since the ratio of the weight of the assembly 8, 12, and 14, and tension of spring 32, plus frictional resistance, to the cross-sectional area of plunger body 8, is less than the ratio of the weight of weight 14 and valve 12 to the cross sectional area of passage 10 in plunger 8, the valve will remain closed and the plunger will be forced upwardly. This may be expressed mathematically as follows:

Let W=force required to move plunger 8 upwardly against tension of spring 32, weight of plunger 8, valve 12 and weight 14, and frictional resistance.

Let W'=force required to move valve 12 upwardly against weight of valve 12 and weight 14.

Let A=cross sectional area of body of plunger 8.

Let A'=cross sectional area of valve seat 10.

Then:

$$\frac{W}{A} < \frac{W'}{A'}$$

The plunger moves upwardly until the lip 16 abuts the ring members 42 and 44 whereupon the upward travel of the plunger is halted and the continued flow of fluid from the pumping mechanism forces valve 12 and the valve weight 14 upward opening passageway 10. At the same time the pressure differential on the plunger 8 is released thus permitting it to fall by gravitational force and the action of the spring 32 at a greater rate than the valve 12 and valve weight 14. The plunger returns to its initial position at rest on the upper face of the bushing 64. When the valve 12 and valve weight 14 return to the closed position, the cycle is ready to be repeated. In order to determine the rate of flow of lubricant through the indicator, the time required for the plunger to complete its upward or forward stroke may be observed through the glass windows 40 and 41, and from this data and the known cubic volume per unit of length of stroke of plunger 8, the volume per unit time can be readily calculated. The glass windows may be directly calibrated in terms of volume units so that the volume displacement can be read directly and divided by the time required for the plunger to move through any portion of the stroke, thereby avoiding the necessity of observing the plunger over the entire forward stroke. The primary purpose of the spring 32 is to accelerate the return of the plunger to its initial position and it should be of such tension that when the adjusting screw 22 is in approximately its uppermost position the plunger 8 can complete a full stroke before valve 12 opens. By adjusting the screw downwardly and increasing the compression on the spring the plunger can be made to return to its initial position more rapidly. This feature is desirable when operating with viscous fluids which offer greater resistance to the downward movement of the plunger. The increased compression on the spring compensates for the increased viscosity. The spring may be of such tension that when sufficiently compressed by the screw 22 it will detent the plunger 8 and permit the valve to open before the completion of the upward stroke thus shortening the stroke of the plunger.

Referring to Figures 3 and 4, the indicator therein illustrated differs from Figure 1 primarily in that the valve 12' is maintained on its seat 10' by means of the retaining plate 70 fastened to the lower end of rod 71 and coil spring 72. The upper end of the rod 71 passes through a hole in the center of cross plate 74 and is guided thereby. The cross plate 74 may be formed integrally with the upper end of plunger 8' and has openings 76 to permit passage of fluid from the interior of the plunger into the cylinder 34'. The upper end of spring 72 abuts against the plate 74 and the lower end abuts against plate 70.

The operation of the indicator shown in Figure 3 is substantially the same as that described in connection with Figure 1 with the exception that instead of weighting the valve 12', the valve is retained on its seat by means of the plate 70 and spring 72. The spring 72 is of sufficient tension to maintain the valve in a closed position until the plunger 8' has moved through its upward or forward stroke. Instead of using a separate ball valve as shown in Figures 1 and 3, any desired shaped valve may be used and the valve may be formed as an integral part of the valve weight 14 or the rod 71. For example, in Figure 3 an inverted cone-shaped element may be substituted for the plate 70 and valve 12' and the element may be fastened to the rod 71. One advantage of the indicator shown in Figure 3 is that it may be used in any plane without disturbing its function since it does not depend on gravity to return the valve to the closed position.

The indicator shown in Figure 5 differs from that shown in Figure 1 in that two plungers 8" and 80 are provided to reciprocate in the cylinder 34" of the body 1". The lower part of the bore 34" is of slightly larger diameter than the upper part, thereby forming shoulder 82. The plunger 80 is of smaller diameter than the plunger 8". Both plungers fit snugly against their respective sliding surfaces. The plunger 8" has a passageway 83 and the plunger 80 is preferably solid. It is apparent that the plunger 80 may be hollow provided that its lower surface is imperforate. The lower surface of the plunger 80 may have a recess 84 into which the seating surface 86 on the upper end of the plunger 8" is adapted to fit in order to form a valve assembly to prevent liquid from passing from the passageway 83 in plunger 8" into the space 34" when the two plungers are in contact with each other.

A bore or passageway 90 is provided in the wall of the body portion 1" so that the upper surface of the bore is adjacent to but preferably slightly below the shoulder 82. The outer end of bore 90 is closed by a screw plug 92. A vertical bore or passageway 94 in the body portion 1" passes from the upper end thereof to the bore 90. The upper end of bore 94 is closed by screw plug 96. A horizontal bore or passageway 98 connects the upper end of the cylinder 34" to the bore 94 and to the outlet 99. The outlet 99 is enlarged and threaded at 100 to receive a suitable connection for a pipe line. It is apparent that instead of boring passageways 90, 94, and 98, a body portion with thin walls having pipe lines connected to the cylinder 34" or other means may be used.

The operation of the indicator shown in Figure 5 is as follows:

With the indicator installed in a vertical position, at the beginning of a stroke, the plunger 8" will be at rest and seated on the top of the bushing 64". The plunger 80 will be seated on the top of plunger 8" thereby closing the passageway 83. As fluid is forced through the bore 66" it exerts pressure on the lower face of the plunger 8" causing it to move upwardly. Since the ratio of the weight and frictional resistances of plungers 8" and 80 to the cross sectional area of plunger 8" is less than the ratio of the weight and frictional resistance of plunger 80 to the cross sectional area of passageway 83, the plunger 80 will remain seated on top of the plunger 8" and the valve 84 will remain on seat 86. The fluid which is in the cylinder 34" above the plungers 8" and 80 will be forced to outlet 99 through the bores 90, 94, and 98. When the upper end of plunger 8" abuts the shoulder 82, the port 90 is closed, and the upward movement of plunger 8" is halted and the continued flow of fluid from the pumping mechanism forces the plunger 80 upward sufficient to break the valve seal between the plungers 8" and 80. Since the differential pressure is released on the plunger 8" it will fall by gravitational force thereby uncovering the port 90 and permitting the fluid to flow therethrough. After the plunger 8" uncovers the port 90 the differential pressure on plunger 80 will be relieved and it will fall downwardly by gravitational force, displacing fluid from the cylinder 34" below the plunger 80 and forcing it through the ports 90, 94, and 98 into the upper portion of the space 34" above the plunger 80. For any fluid that may be forced by the pumping mechanism through the bore 66" during the descent of the plungers an equivalent will pass through the bore 83, ports 90 and 94, and out through the discharge opening 100. The movement of the plunger 8" may be observed through the windows 40" and 41" in the same manner as described in connection with Figures 1 to 4, and the volume-rate of flow per unit time can be calculated in the same manner.

It will be obvious to one skilled in the art that the body portion of the devices shown and described may be formed from suitable metal or alloy by casting and machining operations.

Although I have shown but three specific embodiments of my invention it is to be understood that the invention is not limited to the particular devices shown and described but it is intended to cover all equivalent devices which utilize the principle of operation embodied by the devices herein shown and described.

What I claim is:

1. A fluid flow indicator comprising a body having an inlet and an outlet opening connected by a passageway, a reciprocating means in said passageway, said reciprocating means being provided with a passageway adapted to connect said inlet and outlet, means for maintaining said last mentioned passageway closed during the entire forward stroke of said reciprocating means, said closing means being displaceable in the direction of the forward stroke of said reciprocating means by the differential pressure of the fluid across the closing means, at the limit of said forward stroke, for establishing equilibrium of fluid pressure on opposite sides of said reciprocating means and to permit the return of said reciprocating means and said closing means to their initial positons, and means for disclosing the movement of said reciprocating means.

2. An indicator in accordance with claim 1 including a detent to stop said reciprocating means at the end of its forward stroke.

3. A fluid flow indicating device comprising a body portion having an inlet and outlet connected by a passageway, a reciprocating means in said passageway adapted to prevent passage of fluid therethrough, a passageway through said reciprocating means for permitting flow of fluid from said inlet to said outlet, a valve arranged to close said last mentioned passageway, means for retaining the valve in closed position during the entire advance stroke of said reciprocating means, said valve being displaceable in the direction of the advance stroke of said reciprocating means by the differential pressure of the fluid across said valve, at the limit of said advance stroke, for establishing equilibrium of fluid pressure on opposite sides of said reciprocating means and to permit the return of said reciprocating means and said valve to their initial positions, and means for disclosing the movement of said reciprocating means.

4. An indicating device in accordance with claim 3 including a detent to stop said reciprocating means at the end of its advance stroke.

5. A liquid flow indicator comprising a body portion having an inlet and an outlet connected by a passageway, a reciprocating member snugly mounted in said passageway which prevents flow therethrough from said inlet to said outlet, a second passageway connecting said inlet and outlet, a valve arranged to close said second passageway, said valve being displaceable in the direction of the forward stroke of said reciprocating means by the differential pressure of the fluid across said valve, at the limit of said forward stroke for opening said valve in the direction of the forward stroke of said reciprocating member thereby establishing equilibrium of fluid pressure on opposite sides of said reciprocating means and to permit the return of said reciprocating means and valve to their initial positions, and means for disclosing movement of said reciprocating member.

6. A fluid flow indicator comprising a body portion having an inlet and outlet connected by a passageway, means adapted to reciprocate in said passageway, a passageway in said reciprocating means, a valve adapted to reciprocate with said reciprocating means during the forward stroke thereof and to maintain the passageway therein closed, said valve being displaceable by the differential pressure of the fluid across said valve, at the limit of said forward stroke for establishing equilibrium of fluid pressure on opposite sides of said reciprocating means and to permit the return of said reciprocating means and said valve to their initial positions, a spring abutting against said means positioned to oppose the forward stroke of said reciprocating means and to quickly return it to its initial position at the end of the forward stroke, and means to disclose movement of said reciprocating means.

7. An indicator in accordance with claim 6 including a detent to stop said reciprocating means at the end of its forward stroke.

8. An indicator in accordance with claim 6 in which the valve is displaced in the direction of said forward stroke.

9. A fluid flow indicator comprising a body portion having an inlet and outlet connected by a passageway, a reciprocating member in said passageway, a passageway in said reciprocating member, a valve for closing said last mentioned passageway, said valve being displaceable by the differential pressure of the fluid across said valve at the limit of the forward stroke of said reciprocating means thereby establishing equilibrium of fluid pressure on opposite sides of said reciprocating means and permitting the return of said reciprocating means and said valve to their initial positions, a detent to stop said reciprocating means at the end of its forward stroke, and means for disclosing movement of said reciprocating member.

10. A fluid flow indicating device comprising a body portion having an inlet and outlet connected by a passageway, means adapted to reciprocate in said passageway, a passageway in said reciprocating means, a valve in said last mentioned passageway, said valve being displaceable by the differential pressure of the fluid across it at the end of the forward stroke of said reciprocating means, means comprising a spring for normally holding in and for returning said valve to closed position, a second spring positioned to oppose the advance stroke of said reciprocating means, said springs being of such relative tensions as to permit the valve to be opened by fluid pressure when the reciprocating means has reached the end of its forward stroke, and means for disclosing the movement of said reciprocating means.

11. A fluid flow indicator comprising a body portion having an inlet and outlet connected by a passageway, a reciprocating means in said passageway, a passageway through said reciprocating means, to permit flow from said inlet to said outlet, a valve in said last mentioned passageway, said valve being displaceable by fluid pressure across it, at the end of the forward stroke of said reciprocating means, means for normally holding said valve in and for returning said valve to closed position, means for varying the length of the forward stroke of said reciprocating means, and means for disclosing the distance through which said reciprocating means moves.

12. A fluid flow indicator comprising a body portion having an inlet and outlet connected by a passageway, a reciprocating means in said passageway, a passageway through said reciprocating means to permit flow from said inlet to said outlet, a valve in said last mentioned passageway, said valve being displaceable by differential fluid pressure at the end of the forward stroke of said reciprocating means, means for normally holding said valve in and for returning said valve to closed position, means comprising a spring for opposing the advance stroke of said reciprocating means, means for varying the tension of said spring whereby to vary the stroke of said reciprocating means, and means for disclosing the length of the stroke of said reciprocating means.

13. A fluid flow indicating device comprising a body portion having an inlet and outlet connected by a passageway, the lower portion of said passageway having a larger diameter than the upper portion thereof whereby to form a shoulder along the line where the two portions meet, a member adapted to reciprocate in the portion of larger diameter, said member having a passageway to permit passage of fluid from said inlet to said outlet, a second member adapted to reciprocate in the portion of smaller diameter, said second member being adapted to seat on the top of said first member and form a closure for the passageway in said member, there being passageways connecting the upper ends of said small and large diameter portions to each other and to said outlet, and means for disclosing the movement of at least one of said reciprocating members.

14. A fluid flow indicating device comprising a body portion having an inlet and an outlet connected by a passageway, means adapted to reciprocate in said passageway, a passageway in said reciprocating means, a valve in said last mentioned passageway, said valve being displaceable by the differential pressure of the fluid across it at the end of the forward stroke of said reciprocating means, weight means for normally holding said valve in and returning said valve to closed position, means for detenting said reciprocating means at the end of its forward stroke, a spring in said first mentioned passageway adapted to be compressed during the forward stroke of said reciprocating means and adapted to quickly return said reciprocating means to its initial position, and means for disclosing the movement of said reciprocating means.

15. A fluid flow indicating device comprising a body portion having an inlet and outlet connected by a passageway, means adapted to reciprocate in said passageway, a passageway in said reciprocating means, a valve for closing said last mentioned passageway, said valve being displaceable by the differential pressure of the fluid across it, at the end of the forward stroke of said reciprocating means, means comprising a spring for normally holding said valve in and for returning said valve to closed position, a second spring mounted in said first mentioned passageway, adapted to rapidly return said reciprocating means to its initial position, means to detent said reciprocating means at the end of its forward stroke, and means for disclosing the movement of said reciprocating means.

16. A device for permitting observation of flow of liquids comprising a body portion having an inlet and outlet connected by a passageway, a reciprocating member snugly mounted in said passageway, there being a passageway through said reciprocating member to permit flow from said inlet to said outlet, a valve in said passageway, means for retaining the valve in closed position during the entire forward stroke of said reciprocating member and adapted to permit the valve to be opened in the direction of the forward stroke of said reciprocating member by fluid pressure, and means for disclosing the movement of said reciprocating member.

17. A device for disclosing flow of fluids comprising a body portion having an inlet and an outlet connected by a passageway, a reciprocating member snugly mounted in said passageway, there being a passageway in said reciprocating member, a spring mounted in said body to rapidly return said reciprocating member to its original position at the end of its forward stroke, means to detent said reciprocating member at the end of its stroke, a valve adapted to maintain the passageway in said reciprocating member closed during the entire forward stroke of said member, and means for disclosing movement of said reciprocating member.

18. A device for disclosing flow of fluids comprising a body portion having an inlet and an outlet connected by a passageway, a plunger adapted to fit snugly in said passageway and reciprocate therein, there being a passageway in said plunger to permit fluid to flow therethrough from said inlet to said outlet, a movable closure for said last-mentioned passageway adapted to maintain said passageway closed and to move with said plunger during its entire forward stroke, and adapted to open said last mentioned passageway at the end of said forward stroke, a detent for terminating the forward stroke of said plunger, means to cause said plunger to return to its initial position ahead of said closure, and means for disclosing movement of said plunger.

19. A fluid flow indicator comprising a body portion having an inlet and an outlet connected by a passageway, a plunger snugly mounted in said passageway and adapted to reciprocate therein, there being a passageway through said plunger to permit flow of fluid therethrough from said inlet to said outlet, a valve seat in said last-mentioned passageway, a valve seated thereon and adapted to be maintained in closed position during the entire forward stroke of said plunger, means arranged to coact with fluid flowing through said indicator to open said valve at the end of said stroke, said last mentioned means comprising a detent adapted to engage said plunger and terminate the forward stroke thereof, and means disclosing the movement of said plunger.

20. Indicator in accordance with claim 19 in which a spring is provided within said body portion for rapidly returning the plunger to its initial position.

21. Indicator in accordance with claim 19 in which springs are provided for returning said plunger and said valve to their initial position.

CHARLES F. TERRELL, Jr.